Patented Oct. 6, 1936

2,056,854

UNITED STATES PATENT OFFICE 2,056,854

PROCESS FOR THE PRODUCTION OF HIGHLY ACTIVE CARBON

Emil Hene, London, England

No Drawing. Application October 6, 1934, Serial No. 747,251. In Germany December 11, 1933

11 Claims. (Cl. 252—3)

The present invention relates to a process for the production of highly active carbon.

It is known to produce an active carbon by the action of alkali sulphides on organic substances and heating the reaction products to a bright red heat.

It has also already been proposed to produce a carbon which is active with regard to gases from the shells of cocoa beans by extracting these shells, removing fat and certain organic basic and substances and heating the extracting residues. This proposal has however not come into practical use. The carbon produced did not meet even the minimum requirements for a carbon of the kind in question.

According to the present invention the shells of the cocoa beans are also used as the starting material. The invention however is based on the discovery that the particular action of alkali- or alkaline earth sulphide solutions and/or alkali-hydro-sulphide or alkaline earth-hydrosulphide solutions on the untreated or nonextracted shells of cocoa beans leads to the result, that a melt is obtained from which a highly activated carbon can be produced at a low activating temperature of up to 500° C. This is surprising because in those cases, where up till now an alkali-sulphide has been used in producing active carbon the activating temperature has been always much higher and at least 700° C.

The alkali sulphide solution, which is used for the impregnation of the shells is produced in any known manner i. e. in the simplest and cheapest way by boiling illuminating gas purification masses with a potassium sulphate solution and lime. The present process is also valuable on account of the fact that the shells do not need to be ground. It has even been proved that the coarser parts yield a particularly valuable granular carbon.

If the shells impregnated with the alkali sulphide solution are pressed before heating into moulded shapes, briquettes, tablets and so forth, mouldings of the highest degree of activity are produced which do not disintegrate and which—particularly because of their capability of retaining their shape—are of great utility.

On the other hand it is proved, that the untreated shells yield a highly satisfactory product on account of the dissolving action of the alkali sulphide on the fat and other substances of the shells which are not cellulose products.

It is therefore advisable to use the alkali sulphides in such proportion to the cocoa shells that the amount of the former does not exceed as much as the amount of substances in the shells besides cellulose.

The process may for example be carried out as follows:

From lighting gas purification mass, lime and potassium sulphate there is produced in known manner by heating with water a solution from which the largest part of the lime is precipitated and is filtered off together with any other parts which may not have been dissolved.

This solution contains substantially potassium hydrosulphide, potassium sulphide and besides a little potassium sulpho-cyanide.

Of this lye, which may be evaporated to any desired high degree of concentration it is preferable to employ so much that to three parts by weight of shells there is approximately 1 part by weight of alkali-hydrosulphide, if the whole amount of alkali sulphide compounds in the solution is calculated as alkali-hydrosulphide compounds.

The ratio by weight between the quantity of alkali sulphides employed and the cocoa shells may also be chosen in such proportion, that 2–4 parts by weight of the latter are employed with approximately 1 part by weight of solid alkali-hydrosulphide, under the provision, that the sulphides present are calculated as alkali-hydrosulphides.

The shells impregnated with the solution are heated preferably in the absence of any air up to about 500° C., if desired after grinding, preferably in muffles or retorts made of fire-clay, are then cleaned with water and dried.

The recovered lye, which is not taken up by the shells, may be regenerated by boiling it with gas purification mass.

It will be obvious that the lye, which is needed to impregnate the shells can also be directly produced by dissolving alkali or alkaline earth sulfides.

The yield of active carbon amounts to 20–30% of the quantity of shells employed.

The methylene blue figure amounts to about 600 cubic centimetres of a .12% solution for 1 gramme of carbon.

The most important thing is, however, that the decolourizing property for molasses exceeds to an astonishingly great extent that of all the active carbons used in commerce.

What I claim is:—

1. A process for the production of highly active carbon comprising impregnating the untreated shells of cocoa beans with an alkali-sulphide solution and heating the treated product up to about 500° C.

2. A process for the production of highly active carbon comprising impregnating the untreated shells of cocoa beans with an alkaline earth-sulphide solution and heating the treated product up to about 500° C.

3. A process for the production of highly active carbon comprising impregnating the untreated shells of cocoa beans with an alkali-hydrosulphide solution and heating the treated product up to about 500° C.

4. A process for the production of highly active carbon comprising impregnating untreated shells of cocoa beans with an alkaline sulfide solution and heating the treated product up to about 500° C.

5. A process according to claim 1 in which the shells and the impregnated solution is in the proportion by weight of about 2:4 of the shells to one of the solution.

6. A process according to claim 2 in which the shells and the impregnated solution is in the proportion by weight of about 2:4 of the shells to one of the solution.

7. A process according to claim 3 in which the shells and the impregnated solution is in the proportion by weight of about 2 to 4 of the shells to one of the solution.

8. A process according to claim 1 in which the shells and the impregnating solution are in a proportion by weight of about three of the shells to one of the solution.

9. A process according to claim 2 in which the shells and the impregnating solution is in the proportion by weight of about three of the shells to one of the solution.

10. A process according to claim 3 in which the shells and the impregnating solution is in the proportion by weight of about three of the shells to one of the solution.

11. A process for the production of highly active carbon comprising impregnating untreated cocoa beans with a solution of a substance, taken from a group consisting of an alkali sulfide, and alkali hydrosulfide, an alkaline earth sulfide and an alkaline earth hydrosulfide, and heating the treated product up to about 500° C.

EMIL HENE.